US012644773B2

(12) United States Patent
Kondo et al.

(10) Patent No.: US 12,644,773 B2
(45) Date of Patent: Jun. 2, 2026

(54) TEMPERATURE CONTROL SYSTEM, TEMPERATURE CONTROL METHOD AND TEMPERATURE CONTROL PROGRAM FOR FACILITY EQUIPMENT

(71) Applicants: TRINITY INDUSTRIAL CORPORATION, Aichi (JP); HUMAN SUPPORT TECHNOLOGY CO., LTD., Ibaraki (JP)

(72) Inventors: Yasushi Kondo, Aichi (JP); Koji Ono, Ibaraki (JP)

(73) Assignees: TRINITY INDUSTRIAL CORPORATION, Aichi (JP); HUMAN SUPPORT TECHNOLOGY CO., LTD., Ibaraki (JP)

( * ) Notice: Subject to any disclaimer, the term of this patent is extended or adjusted under 35 U.S.C. 154(b) by 666 days.

(21) Appl. No.: 17/927,908

(22) PCT Filed: May 20, 2021

(86) PCT No.: PCT/JP2021/019126
§ 371 (c)(1),
(2) Date: Nov. 28, 2022

(87) PCT Pub. No.: WO2021/241386
PCT Pub. Date: Dec. 2, 2021

(65) Prior Publication Data
US 2023/0204427 A1      Jun. 29, 2023

(30) Foreign Application Priority Data
May 28, 2020      (JP) ................................. 2020-093377

(51) Int. Cl.
*G01J 5/48* (2022.01)
*G01J 5/00* (2022.01)
(Continued)

(52) U.S. Cl.
CPC ...... *G01J 5/48* (2013.01); *G06T 5/80* (2024.01); *G06T 7/0004* (2013.01); *G06T 7/55* (2017.01);
(Continued)

(58) Field of Classification Search
CPC ...................... G01J 5/48; G06T 7/0004; G06T 2207/30204; G01M 3/002
See application file for complete search history.

(56) References Cited

U.S. PATENT DOCUMENTS 10,819,905 B1 *  10/2020  Liu ........................ H04N 23/80
2005/0265423 A1 *  12/2005  Mahowald ........... G08B 17/125
374/121

(Continued)

FOREIGN PATENT DOCUMENTS

JP          06-138003          5/1994
JP          10-111714          4/1998
(Continued)

OTHER PUBLICATIONS

Notice of Reasons for Refusal dated Dec. 9, 2024, issued in corresponding application No. JP 2020-093377.
(Continued)

*Primary Examiner* — Emily C Terrell
*Assistant Examiner* — Jacqueline R Zak
(74) *Attorney, Agent, or Firm* — Millen, White, Zelano & Branigan, P.C.; Christopher W. Brody

(57)          ABSTRACT
A facility-equipment temperature control system allows for controlling the surface temperature of the facility equipment at a low cost and reduction in workload. The facility-equipment temperature control system includes a non-fixed image-capturing device and an image-processing device. The image-capturing device captures the image of the surface of facility equipment to obtain a visible image and a thermal image. Based on the shape information of the
(Continued)

common reference part existing in the first visible image and the second visible image, the image-processing device sets a comparison area at the same position and in the same range on the first visible image and the second visible image. In addition, the image-processing device corrects the deviation of the field angle in the comparison area of the first thermal image and the second thermal image and displays the temperature-difference-information, which was obtained by comparing the corrected thermal images on the display screen.

11 Claims, 11 Drawing Sheets

(51) Int. Cl.
   *G06T 5/80*       (2024.01)
   *G06T 7/00*       (2017.01)
   *G06T 7/55*       (2017.01)
   *H04N 23/11*     (2023.01)
(52) U.S. Cl.
   CPC ...... *H04N 23/11* (2023.01); *G01J 2005/0077* (2013.01); *G06T 2207/10048* (2013.01); *G06T 2207/30164* (2013.01); *G06T 2207/30204* (2013.01)

(56) References Cited

U.S. PATENT DOCUMENTS

| | | | | |
|---|---|---|---|---|
| 2012/0253583 A1* | 10/2012 | Herdle | .................. | E21C 35/282 |
| | | | | 701/28 |
| 2021/0329178 A1* | 10/2021 | Nguyen | .................... | G01J 5/20 |
| 2022/0065457 A1* | 3/2022 | Bailey | .................... | H05B 6/062 |

FOREIGN PATENT DOCUMENTS

| | | |
|---|---|---|
| JP | 2007-515621 | 6/2007 |
| JP | 2008-039656 | 2/2008 |
| JP | 2009-162571 | 7/2009 |
| JP | 4904426 | 3/2012 |
| JP | 2012-068746 | 4/2012 |
| JP | 2012-098170 | 5/2012 |
| JP | 2015-141084 | 8/2015 |
| JP | 2015204079 A | 11/2015 |
| JP | 2015219014 A | 12/2015 |
| JP | 2019-018999 | 2/2019 |
| WO | 2013/174289 | 11/2013 |

OTHER PUBLICATIONS

Anonymous: "User's manual FLIR One series", Jan. 2, 2018, pp. 1-28, XP093163091.

* cited by examiner

First visible image 31a

Second visible image 31b

FIG. 3

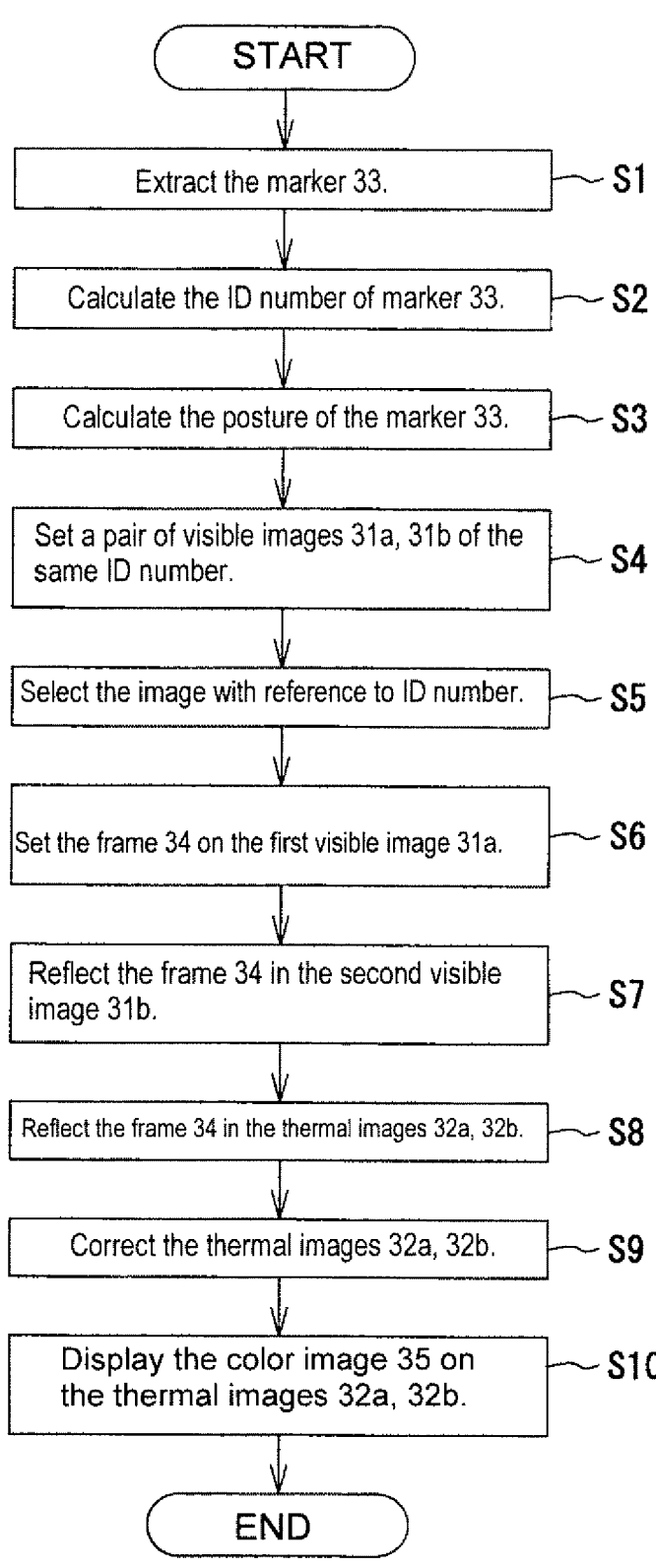

START

Extract the marker 33. — S1

Calculate the ID number of marker 33. — S2

Calculate the posture of the marker 33. — S3

Set a pair of visible images 31a, 31b of the same ID number. — S4

Select the image with reference to ID number. — S5

Set the frame 34 on the first visible image 31a. — S6

Reflect the frame 34 in the second visible image 31b. — S7

Reflect the frame 34 in the thermal images 32a, 32b. — S8

Correct the thermal images 32a, 32b. — S9

Display the color image 35 on the thermal images 32a, 32b. — S10

END

Second visible image 31b

First visible image 31a

FIG. 6(b)
Second visible image 31b

FIG. 6(a)
First visible image 31a

FIG. 7(b)
Second thermal image 32b

FIG. 7(a)
First thermal image 32a

| Temperature change | Color | Indication |
|---|---|---|
| rises by 50℃ or more | Red | |
| rises by 10℃ or more | Orange | |
| falls by 10℃ or more | Blue | |
| Others | No color | |

First thermal image 51a

Second thermal image 51b

| Temperature change | Color | Indication |
|---|---|---|
| falls by 10℃ or more | Blue | |
| rises by less than 10℃ | Yellow | |
| rises by 10℃ or more | Red | |
| rises by 50℃ or more | Pink | |

TEMPERATURE CONTROL SYSTEM, TEMPERATURE CONTROL METHOD AND TEMPERATURE CONTROL PROGRAM FOR FACILITY EQUIPMENT

TECHNICAL FIELD

The present invention relates to a system, a method and a program for controlling the surface temperature of facility equipment.

TECHNICAL BACKGROUND

Conventionally, facility equipment such as a coating drying furnace is used for drying coating material applied to a work such as an automobile body or the like. Thus, hot air is constantly supplied to the drying furnace to dry the coating material reliably. However, due to the deterioration of the drying furnace, cracks may occur in the exhaust duct (not shown) installed in the drying furnace, the walls of the drying furnace, etc., and the hot air in the drying furnace may leak outside through the cracks. Therefore, a technique has been proposed for detecting hot air leakage by periodically capturing the image of the surface of the drying furnace with a thermo-camera to check the surface temperature (see, for example, Patent Documents 1 and 2).

PRIOR ARTS

Patent Documents

Patent Document 1: Japanese Unexamined Patent Application Publication No. H10-111714 (FIG. 9, etc.)
Patent Document 2: Japanese Unexamined Patent Application Publication No. H6-138003 (FIG. 1, etc.)

DISCLOSURE OF THE INVENTION

Problems to be Solved by the Invention

Incidentally, an image captured by a thermo-camera is transmitted to a computer to confirm the surface temperature based on the captured image. To compare the captured image by the computer, it is necessary to use a fixed-type thermo-camera so that the position and angle of the image do not change. However, fixed-type thermal cameras are relatively expensive. In addition, the drying furnace extends along the direction in which the work is conveyed and has a length of tens of meters. Therefore, to capture the image of the entire surface of the drying furnace, it is necessary to install many expensive thermo-cameras along the conveying direction, thus resulting in a problem of high installation costs. Also, if a nonfixed-type thermo-camera is used, it is necessary to capture the image of the surface of the drying furnace at the same position and at the same angle each time, thus leading to a problem of increase in the operator's workload.

The present invention has been achieved considering the above problems, and an object of the present invention is to provide a facility-equipment temperature control system, a facility-equipment temperature control method, and a facility-equipment temperature control program that can control the surface temperature of the facility equipment at low cost and reduce the workload.

Means for Solving the Problem

To solve the above problems, the first aspect of the present invention refers to a system for controlling the surface temperature of facility equipment, characterized by including: a non-fixed image-capturing device for capturing an image of a surface of the facility equipment to obtain a visible image and a thermal image; a display device for displaying the visible image and the thermal image; and an image processing device that sets a comparison area at the same position and in the same range of a first visible image and a second visible image, based on shape information of a common reference part present between the first visible image obtained by capturing the image of a specific measurement point in the facility equipment and the second visible image obtained by capturing the image of the same measurement point in the facility equipment at different times; then corrects the deviation of the field angle for the comparison area of these thermal images so that the first thermal image corresponding to the first visible image and the second thermal image corresponding to the second visible image can be superimposed, thus displaying the temperature difference information obtained by comparing the corrected thermal images on the display device.

According to the first aspect of the present invention, a non-fixed image-capturing device, which is relatively less expensive than a fixed type, is used to capture the image of the surface of the facility equipment. In addition, since the image-capturing device is a non-fixed type, one image-capturing device can capture the image of the entire surface of the facility equipment. Thus, many image-capturing devices are not necessarily required to be installed to capture the image of the entire surface of the facility equipment. Therefore, the cost required for controlling the surface temperature of the facility equipment can be significantly reduced compared to the case where a fixed-type image-capturing device is used.

However, when a non-fixed type image-capturing device is used, the field angle of the visible image and of the thermal image changes each time they are captured, making it impossible to compare each image captured at different times accurately. Therefore, the surface temperature of the facility equipment cannot be controlled accurately. Thus, according to the first aspect of the present invention, the image processing device sets the comparison area at the same position and in the same range on the first visible image and the second visible image taken at different times. Then, the image processing device automatically corrects the deviation of the field angle on the comparison area of these thermal images, thus making it possible to superimpose the first thermal image corresponding to the first visible image over the second thermal image corresponding to the second visible image. As a result, it is possible to compare each thermal image so that changes in the surface temperature of the facility equipment can be accurately controlled. Furthermore, since the image processing device automatically corrects the deviation of the field angle, an operator does not have to capture the image of the surface of the facility equipment at the same position and at the same angle each time so that the operator's workload is reduced.

As a method for correcting the deviation of the field angle of the thermal image, a method for correcting the deviation of both the first thermal image and the second thermal image, a method for correcting the deviation of the field angle of the first thermal image to match the field angle of the second thermal image, a method for correcting the deviation of the field angle of the second thermal image to match the field angle of the first thermal image or the like is given.

The second aspect of the present invention refers to a system for controlling the surface temperature of facility equipment according to the first aspect of the present invention, wherein the image processing device corrects a deviation of field angle of at least, one of the first visible image and the second visible image based on the comparison area, and displays the temperature difference information on the display device while being superimposed on a corresponding portion of the corrected first visible image or of the corrected second visible image.

According to the second aspect of the present invention, the temperature difference information indicating the magnitude of the temperature change is displayed on the display device while being superimposed on the first visible image or on the first visible image where the surface of the facility equipment is easy to see, but not on the thermal image where the surface of the facility equipment is difficult to see. This allows the operator to accurately recognize which part of the surface of the facility equipment has a significant temperature change.

The third aspect of the present invention refers to a system for controlling the surface temperature of facility equipment according to the first aspect of the present invention, wherein the image processing device displays the temperature difference information on the display device while being superimposed on the corresponding portion of the corrected first visible image or of the corrected second visible image.

According to the third aspect of the present invention, the temperature difference information indicating the magnitude of the temperature change is displayed while being superimposed on the first thermal image or on the second thermal image indicating the surface temperature of the facility equipment. This allows the operator to learn not only the temperature change but also the surface temperature of the facility equipment.

The fourth aspect of the present invention refers to a system for controlling the surface temperature of the facility equipment according to any one of the first to third aspects of the present invention, wherein the common reference part has different geometric features at each measurement point and is a two-dimensional marker attached to the surface of the facility equipment.

According to the fourth aspect of the present invention, since the common reference part is a two-dimensional marker, the shape information becomes simpler than that in the case of, for example, a three-dimensional marker. As a result, the alignment control based on the shape information of the markers becomes easy so that the workload on the image processing device can be reduced. In addition, since the common reference part has different geometric features at each measurement point, the measurement point can be reliably distinguished from others, thus making it possible to perform the alignment control reliably.

The fifth aspect of the present invention refers to a system for controlling the surface temperature of facility equipment according to the fourth aspect of the present invention, characterized by comprising; a storage part to store the visible image and the corresponding thermal image; and a past-image selection unit that refers to the marker when the second visible image is newly captured at the specific measurement point with the image-capturing device, selects the first visible image captured at the same measurement point in the past and the corresponding first thermal image, and reads them from the storage part.

According to the fifth aspect of the present invention, when a second visible image is newly captured at a specific measurement point, the past-image selection unit refers to the marker so as to automatically select the first visible image and the first thermal image corresponding to the first visible image. This eliminates the need for the operator to select a specific one from among a plurality of past images. Therefore, the workload of the operator is further reduced.

The sixth aspect of the present invention refers to a system for controlling the surface temperature of facility equipment according to any one of the first to fifth aspects of the present invention, wherein the temperature difference information is a color image of which different colors are set according to the level of the temperature difference.

According to the sixth aspect of the present invention, the temperature difference information is a color image that implicitly shows the level of the temperature difference so that the operator can quickly identify how much the temperature difference is only by checking the temperature difference information.

The seventh aspect of the present invention refers to a system for controlling the surface temperature of facility equipment according to any one of the first to sixth aspects of the present invention characterized by further having a warning device that issues a warning when a temperature difference provided by comparing the thermal images exceeds a predetermined threshold.

According to the seventh aspect of the present invention, since a warning is issued when the temperature difference exceeds the threshold, it is possible to reliably make the operator aware that the surface temperature of the facility equipment has excessively changed. As a result, the operator can quickly respond to an abnormality in the surface temperature.

In addition, as a warning device, for example, a light-emitting device such as a lamp or the like to issue the warning that the temperature difference exceeds the threshold by emitting light (lighting, blinking, etc.), a sound-output device such as an alarm or the like to warn by voice (warning sound, etc.) that the temperature difference exceeds the threshold, a display device such as a liquid crystal display device to warn that the temperature difference exceeds the threshold by displaying (characters, symbols, pictures, etc.), or the like is given.

The eighth aspect of the present invention refers to a method for controlling the surface temperature of facility equipment using a non-fixed image-capturing device for capturing a visible image and a thermal image by capturing the image of the surface of the facility equipment and a display device for displaying the visible image and the thermal image characterized by comprising: a comparison-area setting step for setting a comparison area at the same position and in the same range in the first visible image and in the second visible image based on the shape information of a common reference part present in a first visible image obtained by capturing the image of the specific measurement point of the facility equipment and a second visible image obtained by capturing the image of the same measurement point of the facility equipment at different times; a correction step for correcting the deviation of the field angle in the comparison area of the thermal images so that a first thermal image corresponding to the first visible image and a second thermal image corresponding to the second visible image are superimposed; a temperature-difference information obtaining step for obtaining temperature difference information by comparing the corrected thermal images; and a temperature difference information display step for displaying the temperature difference information on the display device.

The ninth aspect of the present invention refers to a facility-equipment temperature control program to run a processor that controls the facility-equipment temperature control system, including a non-fixed type image-capturing device that captures a visible image and a thermal image of the surface of the facility equipment and a display device that displays the visible image and the thermal image to execute; a comparison area setting step for setting a comparison area at the same position and in the same range of the first visible image and the second visible image based on the shape information of a common reference part present in a first visible image obtained by imaging (capturing) a specific measurement point in the facility equipment and a second visible image obtained by imaging (capturing) the same measurement point of the facility equipment at different times; a correction step for correcting the deviation of the field angle in the comparison area of the thermal images so that a first thermal image corresponding to the first visible image and a second thermal image corresponding to the second visible image are superimposed; a temperature-difference-information obtaining step for obtaining the temperature difference information by comparing the corrected thermal images: and a temperature-difference-information display step for displaying the temperature difference information on the display device.

Effects of the Invention

As detailed above, according to the first to ninth aspects of the present invention, it is possible to control the surface temperature of the facility equipment at a low cost, and the operator's workload can be reduced.

BRIEF DESCRIPTION OF THE DRAWINGS

FIG. 3 is the flow chart showing a process for controlling the surface temperature of the drying furnace.

Figures 6A, 6B:
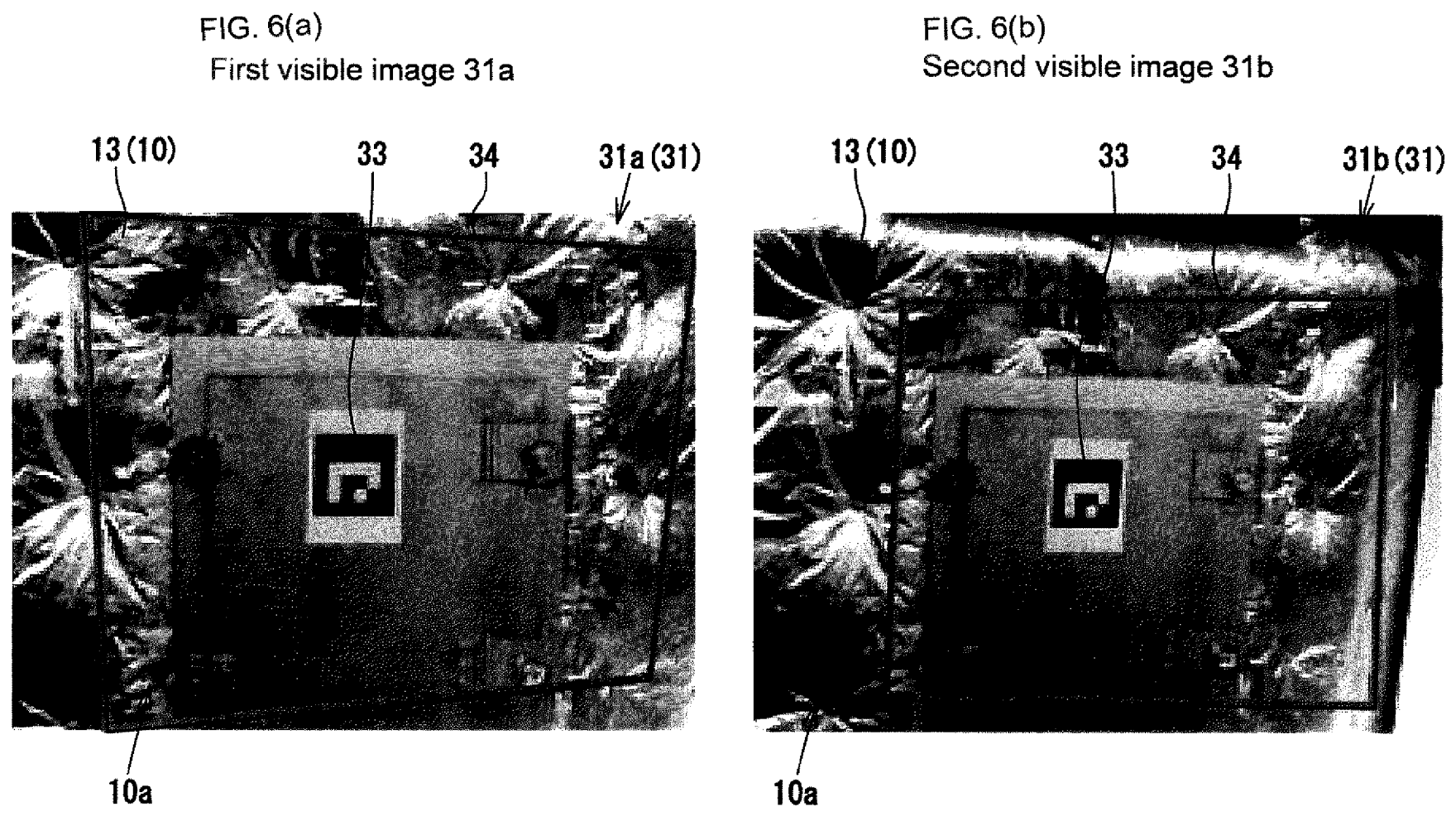

FIG. 6(a) is the photograph showing the first visible image in which a frame is set, and FIG. 6(b) is the photograph showing the second visible image in which a frame is set.

FIG. 7(a) is the explanatory diagram showing a method for correcting the first thermal image and FIG. 7(b) is the explanatory diagram showing a method for correcting the second thermal image.

MODES FOR CARRYING OUT THE INVENTION

First Embodiment

Hereinafter, the first embodiment embodying the present invention will be described in detail below with reference to the drawings.

Figure 1:
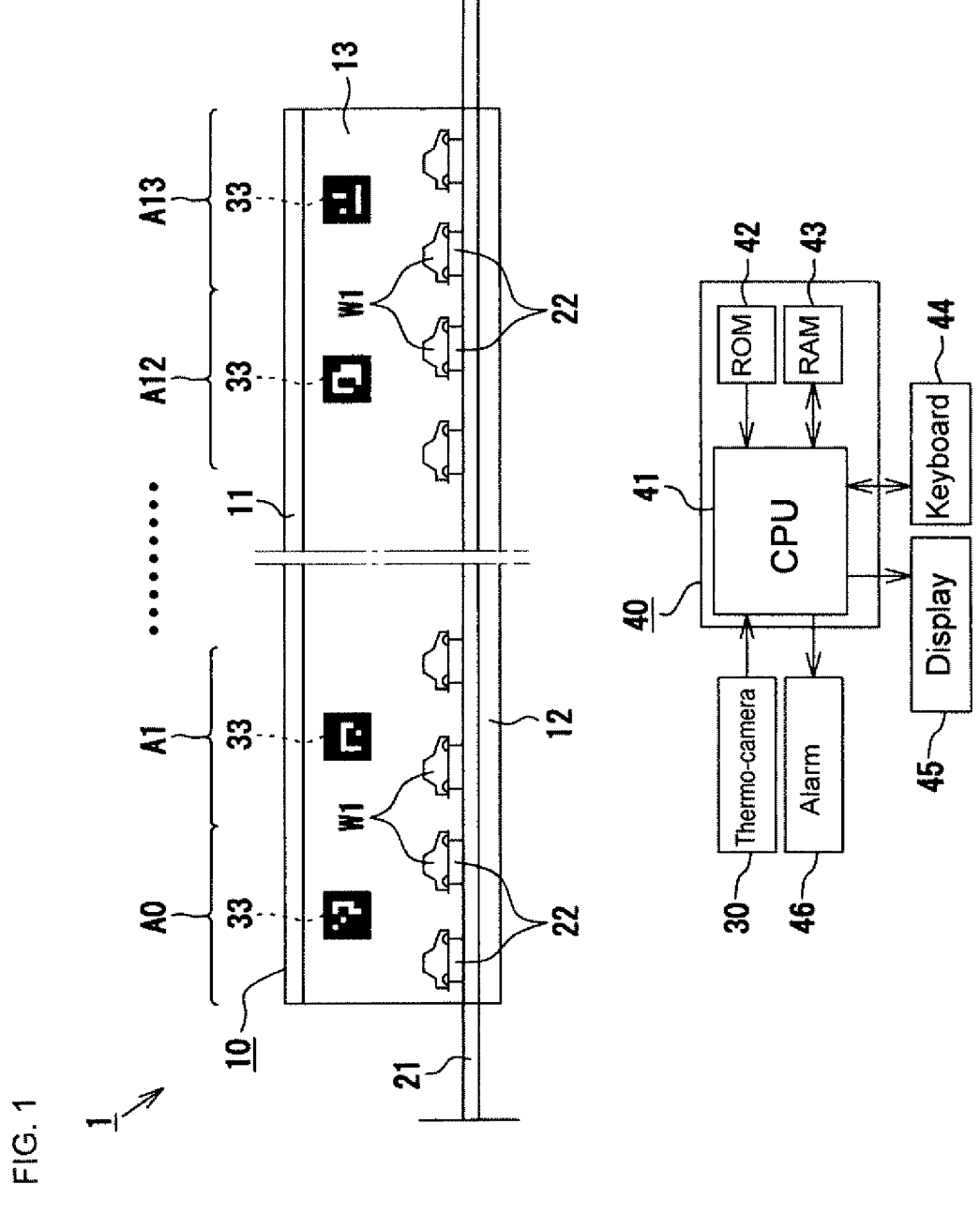
FIG. 1 is the schematic configuration diagram showing a facility-equipment temperature control system according to the first embodiment.

As shown in FIG. 1, the facility-equipment temperature control system 1 of this embodiment is a system for controlling the surface temperature of a drying furnace 10 (facility equipment). The drying furnace 10 is for drying the coating agent applied to the surface of the work W1 (automobile body in this embodiment) that has passed through a coating booth (not shown). The drying furnace 10 is formed in a substantially rectangular parallelepiped shape using wall materials such as iron plates or the like and includes a ceiling part 11, a floor part 12, and a pair of side walls 13. Furthermore, a conveyor 21 is provided on the floor 12 of the drying furnace 10. The conveyor 21 is a system that conveys a plurality of carts 22 on which the works W1 are placed along the conveying direction (the right direction as illustrated in FIG. 1).

A plurality of markers 33 are arranged on surface 10a (see FIG. 2) of side wall 13 (drying furnace 10) along the conveying direction. Each marker 33 is arranged at the specific measurement points A0 to A13, respectively, in the drying furnace 10. Each marker 33 is a two-dimensional square-shaped sticker attached to the surface 10a and has different geometrical characteristics at measurement points A0 to A13, respectively.

Figures 7A, 7B:
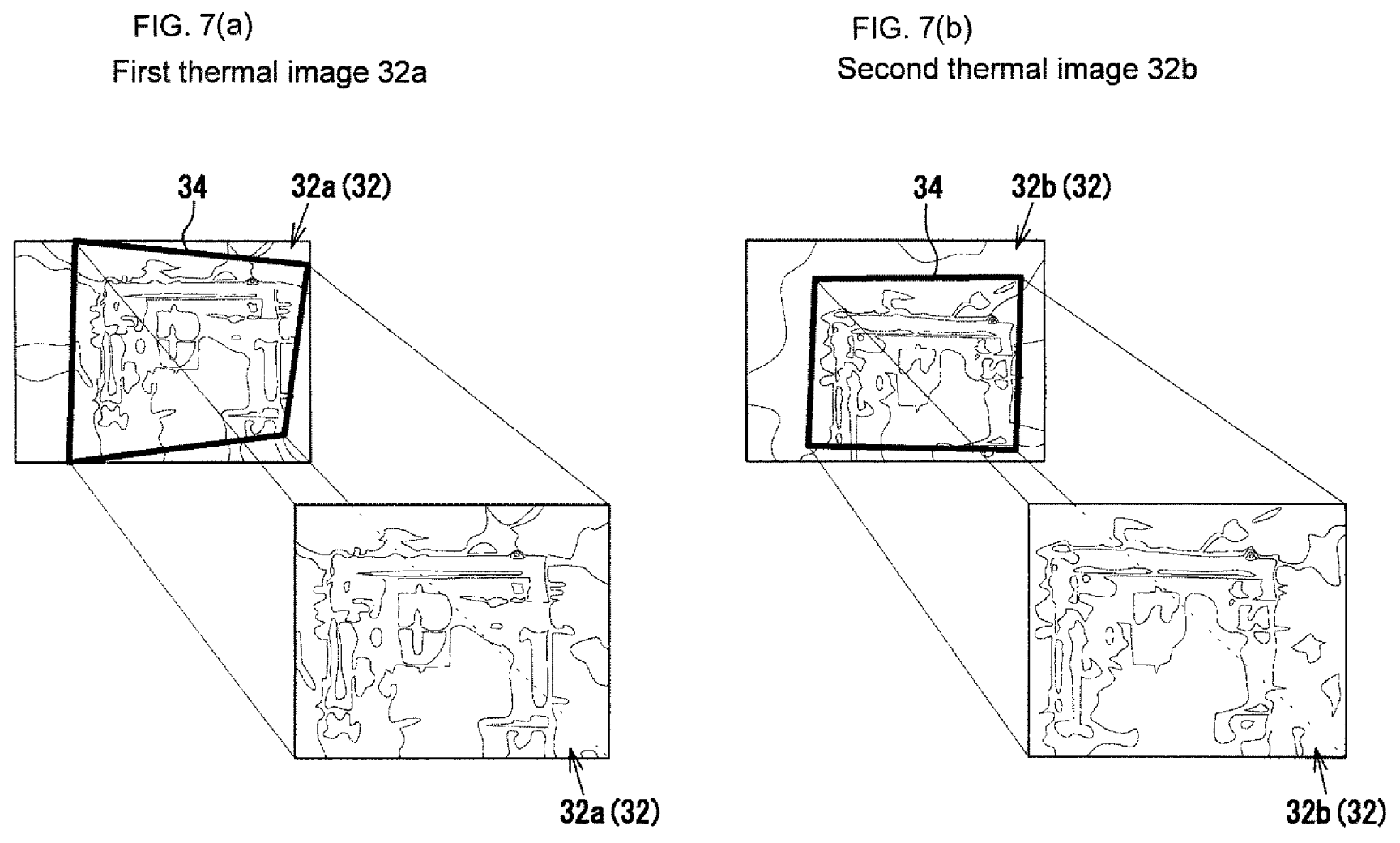

As shown in FIG. 1, the facility-equipment temperature control system 1 includes a thermo-camera 30 as the non-fixed image-capturing device. The thermo-camera 30 obtains a visible image 31 (see FIG. 2) and a thermal image 32 (see FIG. 7) simultaneously by capturing the image of the surface 10a of the drying furnace 10 at measurement points A0 to A13, respectively. Then, the thermo-camera 30 outputs image data of the acquired visible image 31 and thermal image 32. The visible image 31 is a color image, and the thermal image 32 is an infrared image.

Next, the electrical configuration of the facility-equipment temperature control system 1 will be described.

As shown in FIG. 1, the facility-equipment temperature control system 1 includes a computer (not shown) consisting of a control device 40 (processor) to control the entire system integrally. The control device 40 is configured by a well-known computer, including a CPU 41 (image processing device), a ROM 42, a RAM 43, or the like. A keyboard 44 of the computer, a display 45 (display device) of the computer and an alarm 46 are electrically connected to the CPU 41. According to the present embodiment, the thermo-camera 30 is electrically connected to the CPU 41 by connecting the thermo-camera 30 to the control device 40 via a USB (Universal Serial Bus) cable. The visible image 31 and the thermal image 32 acquired by the thermo-camera 30 are stored in the RAM 43. Also, a program for controlling the facility-equipment temperature control system 1 (facility-equipment temperature control program) is stored in the ROM 42.

Next, a temperature control method for the drying furnace 10 will be described.

First, the operator holds the thermo-camera 30 to capture the image of the surface 10*a* of the drying furnace 10 at each of the measurement points A0 to A13, then obtains a visible image 31 and a thermal image 32 at the measurement points A0 to A13, respectively. That is, the thermo-camera 30 of this embodiment is a handy type of camera and acquires the visible image 31 and the thermal image 32 simultaneously with a common optical axis. Therefore, if the thermo-camera 30 acquires the visible image 31 and the thermal image 32 simultaneously, the visible image 31 and the thermal image 32 with the same field angle can be obtained. In addition, the operator takes images of the measurement points A0 to A13 periodically (e.g., monthly).

Then, each time the image of each measurement point A0 to A13 is wholly captured, the operator connects the thermo-camera 30 to the control device 40 of the computer by using the USB cable. At this point, the thermo-camera 30 outputs the acquired image data of the visible image 31 and the thermal image 32 to the CPU 41. Then, the CPU 41 stores the visible image 31 and thermal image 32, indicated by the input image data, into the RAM 43. In other words, the RAM 43 functions as a "storage part."

Figures 2A, 2B:
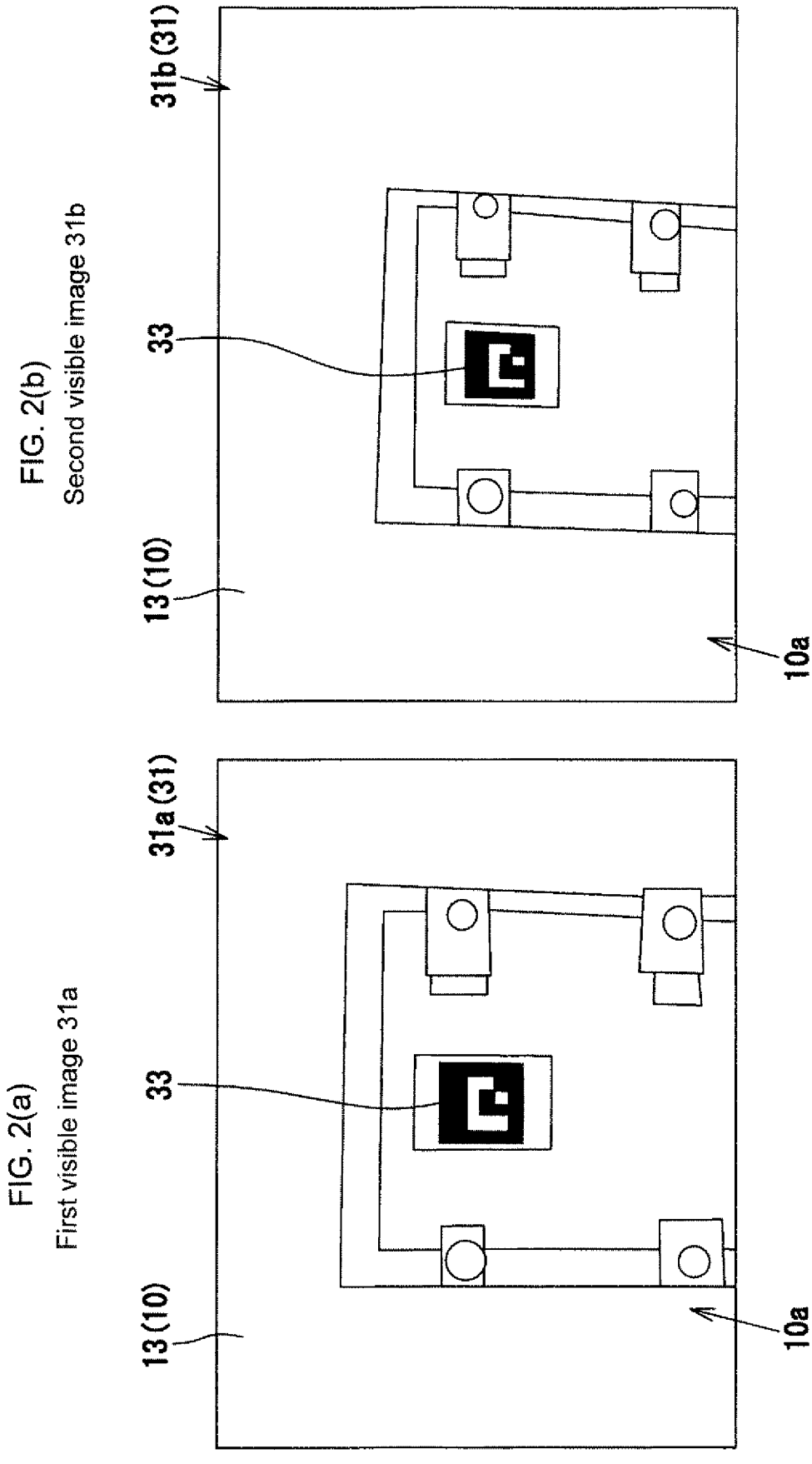
FIG. 2(a) is the schematic diagram showing the first visible image.
FIG. 2(b) is the schematic diagram showing the second visible image.

The visible image 31 stored in the RAM 43 includes the first visible image 31*a* (see FIG. 2(*a*)) which is the comparison-reference (source) visible image 31, and the second visible image 31*b* (see FIG. 2(*b*)) which is the comparison-destination (target) visible image 31. The first visible image 31*a* is the visible image 31 obtained by capturing the image of the measurement points A0 to A13 in the past (e.g., one month ago, in this embodiment), and the second visible image 31*b* is the visible image 31 obtained by newly capturing the image of the same measurement points A0 to A13 at different times (e.g., today, in this embodiment). The thermal image 32 stored in the RAM 43 includes a first thermal image 32*a* (see FIG. 7(*a*)) corresponding to the first visible image 31*a* and a second thermal image 32*b* (see FIG. 7(*b*)) corresponding to the second visible image 31*b*. The first thermal image 32*a* corresponding to the first visible image 31*a* is an image at the same position and the same field angle as the first visible image 31*a* and has a marker 33 of the same ID number as the first visible image 31*a*. Similarly, the second thermal image 32*b* corresponding to the second visible image 31*b*, is an image at the same position and the same field angle as the second visible image 32*b* and has a marker 33 of the same ID number as the second visible image 31*b*. The first visible image 31*a* and the first thermal image 32*a* are stored in the first storage area of the RAM 43, and the second visible image 31*b* and the second thermal image 32*b* are stored in the second storage area of the RAM 43. Also, the first visible image 31*a* and the second visible image 32*b* are images captured at different times; therefore, they have different field angles. Similarly, the second thermal image 32*a* and the second thermal image 32*b* are also images captured at different times; therefore, they have different field angles.

Next, the CPU 41 controls the surface temperature of the drying furnace 10 based on the facility-equipment temperature control program stored in the ROM 42. Specifically, in step S1 shown in FIG. 3, the CPU 41 performs processing such as binarization, contour extraction, and intersection calculation with all the visible images 31*a* and 31*b* stored in the RAM 43, thus controlling the extraction of the marker 33 in the visible images 31*a* and 31*b*. In a subsequent step S2, the CPU 41 calculates the ID numbers (0 to 13) of the extracted marker 33 from the shape of the marker 33. Each ID number (0 to 13) shows the number corresponding to each of the measurement points A0 to A13. Further, in step S3, the CPU 41 calculates the attitude (pitch, yaw and roll) and position of the extracted marker 33 using a conventionally known algorithm such as ARToolkit or the like. In step S4, the CPU 41 extracts the first visible image 31*a* and the second visible image 31*b* one by one that has the same ID number (i.e., the same measurement point) from among the plurality of first visible images 31*a* and the plurality of second visible images 31*b* both stored in the RAM 43 so as to store such a pair of images in the RAM 43.

Next, the CPU 41 performs processing for displaying changes in the surface temperature of the drying furnace 10 at each of the measurement points A0 to A13. In this embodiment, for convenience of explanation, the processing related to the measurement point A1 among the measurement points A0 to A13 will be explained. First, in step S5, the CPU 41 selects the second visible image 31*b* captured at the measurement point A1 and the corresponding second thermal image 32*b* based on the ID number (1) of the marker 33 and reads them from the RAM 43. Furthermore, based on the ID number (1), the CPU 41 selects the first visible image 31*a* captured at the same measurement point A1 in the past (one month ago) and the corresponding first thermal image 32*a* and reads them from the RAM 43. In other words, the CPU 41 functions as a "past-image selecting unit."

Next, the CPU 41 performs the processing of the comparison area setting step to set a frame 34 (see FIGS. 4 and 5) which is a comparison area at the same position and in the same range of the visible images 31*a*, 31*b*, based on the shape information (attitude and position) of the marker 33 which is a common reference part existing in the read visible images 31*a* and 31*b*.

Figure 4:
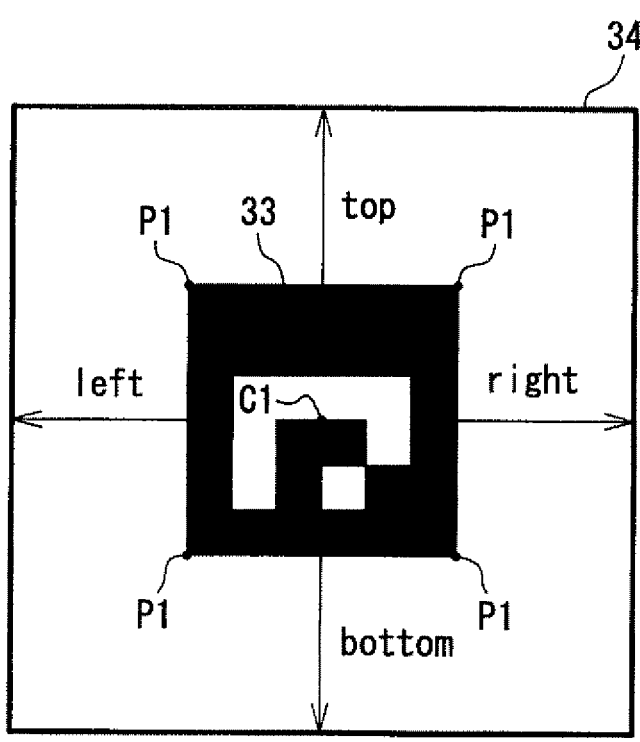
FIG. 4 is the explanatory diagram showing a method of determining a frame.

Specifically, first, the CPU 41 performs processing in step S6 and sets the frame 34 made of a red straight line in the first visible image 31*a* selected in step S5. As shown in FIG. 4, the range of the frame 34 is defined by the length of the upper direction (top), the lower direction (bottom), the left direction (left) and the right direction (right) with respect to the center C1 of the marker 33. The frame 34 is set so as not to protrude from the first visible image 31*a* and to occupy an area as large as possible in the first visible image 31*a*. Also, the frame 34 may not be indicated in red. Instead, it may be indicated with broken lines. Moreover, although the frame 34 of the present embodiment is indicated on the screen of the display 45, it does not have to be indicated.

Specifically, the CPU 41 controls the display 45 to display the initial frame 34 while being superimposed on the first visible image 31*a*. The frame 34, in the initial state, is a frame having a shape similar to that of the marker 33. First, the CPU 41 enlarges the frame 34 until one of the four vertices P1 of the frame 34 contacts the outer peripheral edge of the first visible image 31*a*. Next, the CPU 41 determines whether or not the frame 34 can be extended along the length direction of one of the two diagonal lines of the frame 34, which passes through the vertex P1 in contact with the outer peripheral edge. When it is determined that the frame 34 can be extended, the CPU 41 performs control to extend the frame 34 in the length direction of the diagonal line until any one of the remaining three vertexes P1 which are not in contact with the outer peripheral edge, touches the outer peripheral edge. Furthermore, when there are still two vertices P1 that are not in contact with the outer periphery of the first visible image 31*a* and both vertices P1 are adjacent to each other, the CPU 41 performs control to extend the frame 34 in the direction orthogonal to the side which connects both vertex P1. For example, when the upper left vertex P1 and the upper right vertex P1 are not in contact with the outer peripheral edge of the first visible image 31*a*, the CPU 41 performs control to extend the frame 34 upward. At this point, the frame 34 is set on the first visible image 31*a* (see FIGS. 5(*a*) and 6(*a*)). The frame 34 may also be set by a method different from the above.

In subsequent step S7, the CPU 41 performs control to reflect the frame 34 set in the first visible image 31*a* in the second visible image 31*b* selected in step S5. Specifically, the CPU 41 performs control to display the frame 34 set in the first visible image 31*a* on the display 45 while being superimposed on the second visible image 31*b* based on the marker 33 in the second visible image 31*b* (See FIGS. 5(*b*) and 6(*b*)). In this embodiment, since the imaging range of the second visible image 31*b* is greater than the imaging range of the first visible image 31*a*, the whole reflected frame 34 is displayed so as to fit within the second visible image 31*b*.

In the next step S8, the CPU 41 performs control to reflect the frame 34 set in the first visible image 31*a* in the first thermal image 32*a* selected in step S5. Specifically, the CPU 41 performs control to display the frame 34 set in the first visible image 31*a* on the display 45 while being superimposed on the first thermal image 32*a* as it is (See FIG. 7(*a*)). Further, the CPU 41 performs control to reflect the frame 34 reflected in the second visible image 31*b* in the second thermal image 32*b* selected in step S5. Specifically, the CPU 41 performs control to display the frame 34 set in the second visible image 31*b* on the display device 45 while being superimposed on the second thermal image 32*b* as it is (see FIG. 7(*b*)).

In the next step S9 (i.e., correction step), the CPU 41 performs control to correct the deviation of the filed angle concerning the frame 34 of the first thermal image 32*a* and the second thermal image 32*b*. Specifically, the CPU 41 performs the perspective transformation to calculate the perspective transformation matrix of the frame 34 displayed in the first thermal image 32*a*, then corrects the frame 34 to make it a rectangle with the same area and the same shape as the first thermal image 32*a*, thus defining it as the corrected first thermal image 32*a* (see FIG. 7(*a*)). Similarly, the CPU 41, performs the perspective transformation to calculate the perspective transformation matrix of the frame 34 displayed in the second thermal image 32*b*, then corrects the frame 34 to make it a rectangle with the same area and the same shape as the second thermal image 32*b*, thus defining it as the corrected second thermal image 32*b* (see FIG. 7(*b*)). As a result, the field angle of the first thermal image 32*a* and the field angle of the second thermal image 32*b* match each other so that the first thermal image 32*a* and the second thermal image 32*b* can be superimposed. Furthermore, the CPU 41 performs the perspective transformation to calculate the perspective transformation matrix of the frame 34 displayed in the second visible image 31*b*, then corrects the frame 34 to make it a rectangle with the same area and the same shape as the second visible image 31*b*, thus defining it as the corrected second visible image 31*b*. As a result, the deviation of the field angle of the second visible image 31*b* is corrected to match the field angle of the thermal images 32*a* and 32*b*.

Figures 8, 9:
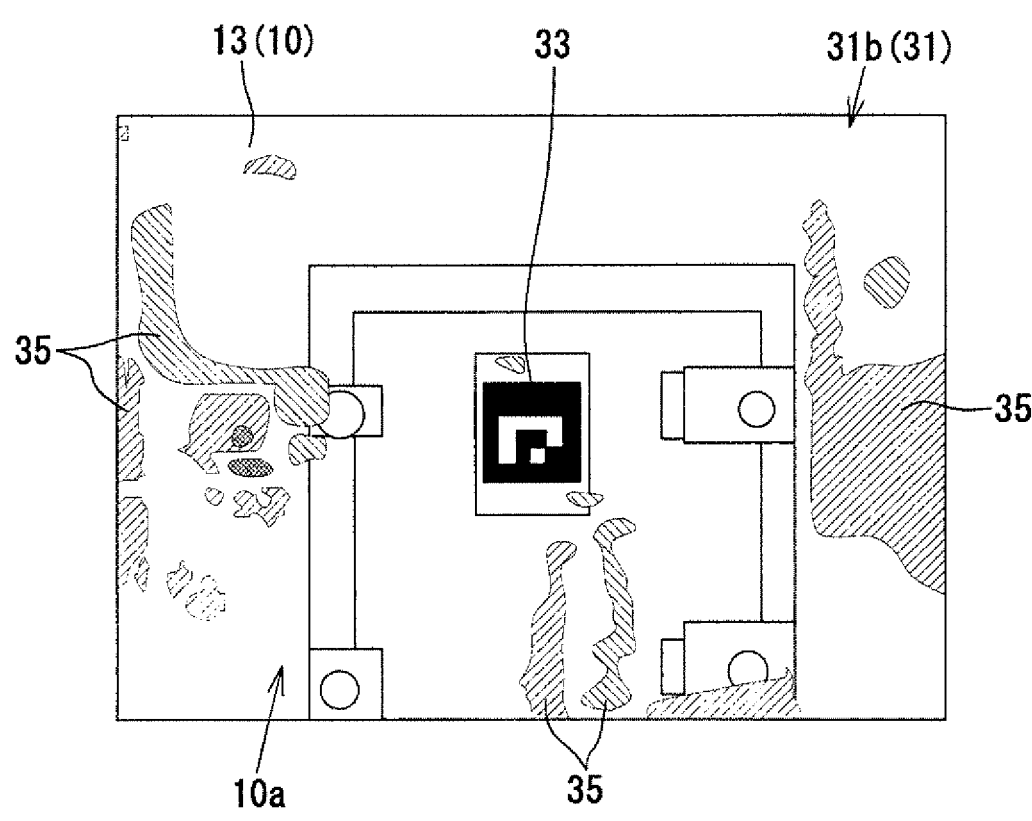
FIG. 8 is the schematic diagram showing the second visible image in which a color image is displayed.
FIG. 9 is the table showing the correspondence between temperature changes and displays.

Next, the CPU 41 performs the temperature-difference-information obtaining step to compare the corrected thermal images 32*a* and 32*b*, then obtains a color image 35 as the temperature difference information (See FIG. 8). Specifically, the CPU 41 calculates a difference between the temperature at each position of the first thermal image 32*a* and the temperature at each position of the second thermal image 32*b*, then defines the calculated difference as the temperature difference. Thus, the CPU 41 sets the color image 35 of different colors according to temperature difference (magnitude) levels. As shown in FIG. 9, when the temperature indicated by the second thermal image 32*b* is higher than the temperature indicated by the previously captured first thermal image 32*a*, or for example, when the temperature rises by 50° C. or more, the color image 35 is indicated in red. Further, when the temperature rises by 10° C. or more and less than 50° C., the color image 35 is indicated in orange. On the other hand, when the temperature indicated by the second thermal image 32*b* is lower than the temperature indicated by the first thermal image 32*a*, or for example, when the temperature decreases by 10° C. or more, the color image 35 is indicated in blue. Also, the color image 35 is not set when the temperature rise is less than 10° C., or when the temperature fall is less than 10° C.

Figure 10:
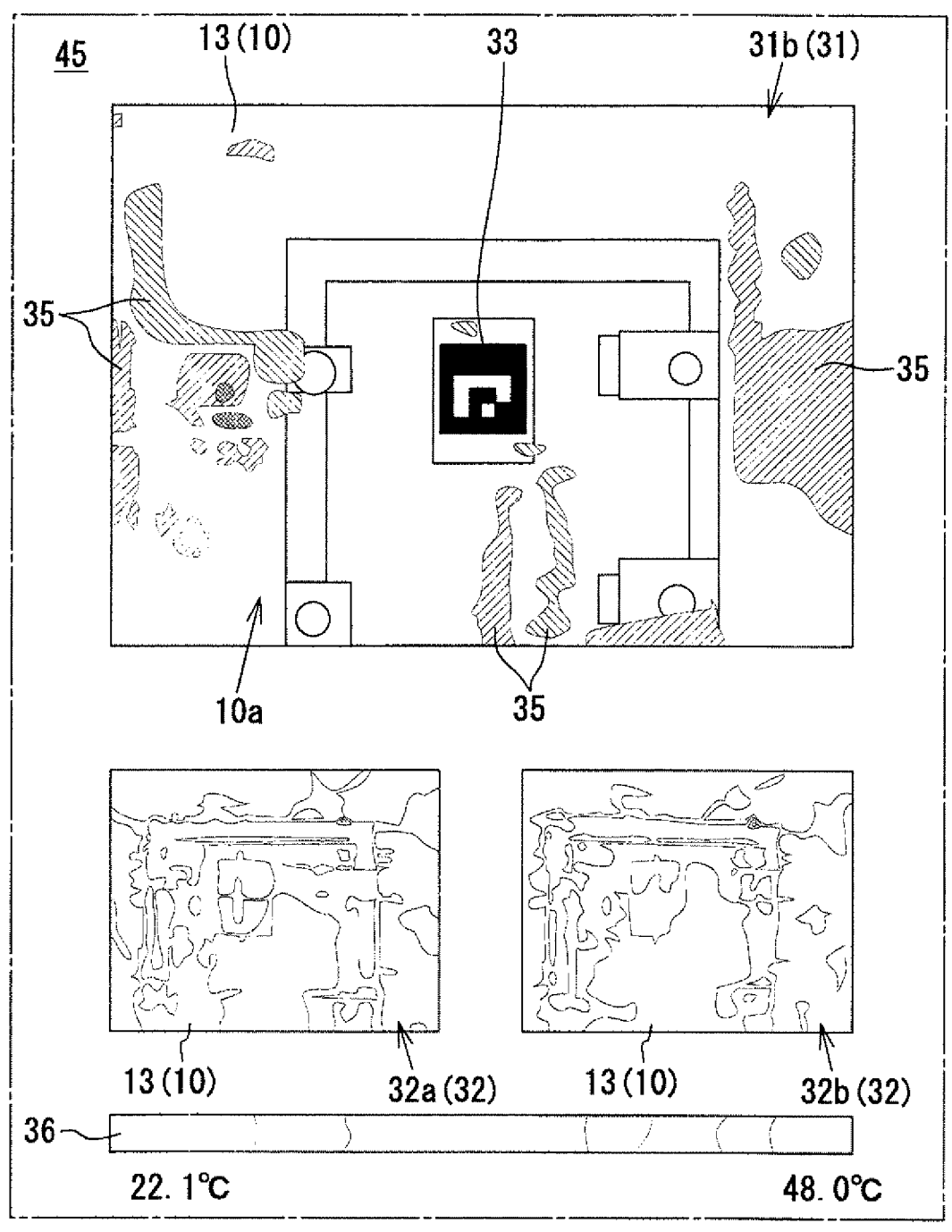
FIG. 10 is the view showing the display in the temperature-difference-information display step.

In a subsequent step S10 (temperature-difference-information display step), the CPU 41 performs control to display the set color image 35 on display 45. Specifically, the CPU 41 displays the color image 35 while being superimposed on the corresponding portion of the corrected second visible image 31*b* (See FIGS. 8 and 10). Thus, portions of surface 10*a* of the drying furnace 10 determined to have a significant temperature rise or drop are displayed in different colors. In this embodiment, the second visible image 31*b* is displayed on the upper portion of the display 45, and the first thermal image 32*a* and the second thermal image 32*b* are displayed side by side below the second visible image 31*b* on the display 45 (See FIG. 10). Further, a rod-shaped temperature indicator 36 extending in the horizontal direction is displayed below the thermal images 32*a* and 32*b* on the display 45. The temperature indicator 36 indicates the relationship between the colors displayed in the thermal images 32*a* and 32*b* and the temperature.

After that, the CPU 41 sequentially executes steps S5 to S10 at the other measurement points A0 and A2 to A13 and calculates the temperature difference between the first thermal image 32*a* and the second thermal image 32*b*. Then, when the temperature differences at all the measurement points A0 to A13 are calculated, the CPU 41 determines whether or not the temperature difference obtained by comparing the thermal images 32*a* and 32*b* at each measurement point A0 to A13 exceeds a predetermined threshold value (i.e., 50° C. in this embodiment). When it is determined that the temperature difference is higher than the threshold, the CPU 41 outputs a drive signal to an alarm 46, assuming that an abnormality has occurred, thus performing control to activate the alarm 46 as a warning device. This warns the operator that there is a high possibility of the hot air inside the drying furnace 10 leaking out due to the high temperature of the surface 10*a* of the drying furnace 10.

Therefore, the following effects can be obtained according to the present embodiment.

(1) According to the facility-equipment temperature control system 1 of the present embodiment, a non-fixed type of thermo-camera 30, which is relatively less expensive than a fixed type, is used to capture an image of the surface 10*a* of the drying furnace 10. Moreover, since the thermo-camera 30 is of a non-fixed type, the image of the entire surface 10*a* of the drying furnace 10 can be captured with a single thermo-camera 30, which eliminates the need to install many thermo-cameras 30 to capture the image of the entire surface 10*a*. Therefore, the cost required for controlling the surface temperature of the drying furnace 10 can be significantly reduced compared to the case of using a fixed type of thermo-camera.

However, when the non-fixed type thermo-camera 30 is used, the field angle of the visible image 31 and of the thermal image 32 changes each time the image is captured, so images captured at different times cannot be accurately compared. Therefore, changes in the surface temperature of the drying furnace 10 cannot be controlled accurately. In this embodiment, the CPU 41 sets the frame 34 at the same position and in the same range on the first visible image 31*a* and on the second visible image 31*b* captured at different times. Then, the CPU 41 automatically corrects the deviation of the field angle of the frame 34 on the thermal images 32*a* and 32*b*, thus making it possible to superimpose the thermal image 32*a* corresponding to the first visible image 31*a* and the second thermal image 32*b* corresponding to the second visible image 31*b*. As a result, since the thermal images 32*a* and 32*b* can be compared with each other, the change in the surface temperature of the drying furnace 10 can be grasped based on the comparison results, thus making it possible to reliably detect the hot air leakage in the drying furnace 10 based on the change in the surface temperature. In addition, since the CPU 41 automatically corrects the deviation of the field angle, the operator does not have to take images of the surface 10*a* of the drying furnace 10 at the same position and at the same angle each time, thus making it possible to reduce the workload of the operator. Therefore, the operator can take images of the measurement points A0 to A13 with the thermo-camera 30 while walking in the drying furnace 30. It is also possible to capture the image of the measurement points A0 to A13 by remotely controlling the thermo-camera 30 loaded on a cart, drone, or the like.

(2) According to the present embodiment, the color image 35 which shows the magnitude of the temperature change, is displayed on the display 45 while being superimposed on the second visible image 31*b*, which makes it easy to visually recognize but not on the second thermal image 32*b* which makes it difficult to recognize visually. Thereby, the operator can accurately recognize which part of the surface 10*a* has a significant temperature change.

(3) According to the present embodiment, when the second visible image 31*b* is newly captured at the measurement points A0 to A13, the CPU 41 refers to the marker 33 to automatically select the first visible image 31*a* captured in the same measurement points A0 to A13 in the past and the corresponding first thermal image 32*a*. This eliminates the need for the operator to select a specific one from among a plurality of past images 31*a* and 32*a*. Therefore, the workload of the operator is further reduced.

Second Embodiment

A second embodiment embodying the present invention will be described below with reference to the drawings. Here, the description will focus on the parts different from the first embodiment. In this embodiment, the temperature control method for the drying furnace 10 differs from that of the first embodiment.

Figures 11A, 11B:
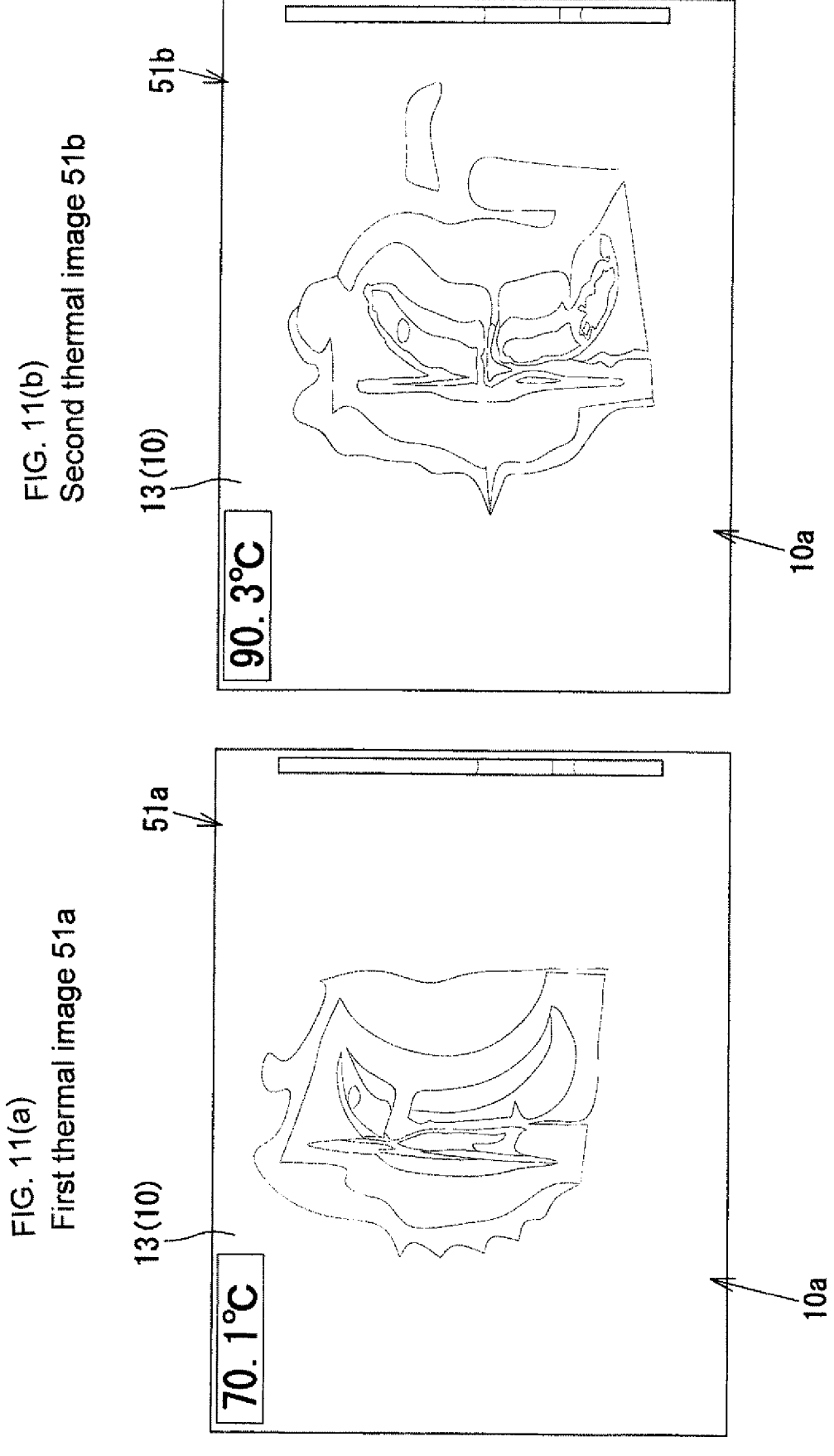
FIG. 11(a) is the schematic diagram showing the first thermal image in the second embodiment.
FIG. 11(b) is the schematic diagram showing the second thermal image.

Specifically, in the correction step (step S9) of the first embodiment above, the CPU 41 also corrects the second visible image 31*b* in addition to the first thermal image 32*a* and the second thermal image 32*b*. However, in the correction step of the present embodiment, the CPU 41 performs control to correct only the first thermal image 51*a* (See FIG. 11(*a*)) and the second thermal image 51*b* (See FIG. 11(*b*)).

Figures 12, 13:
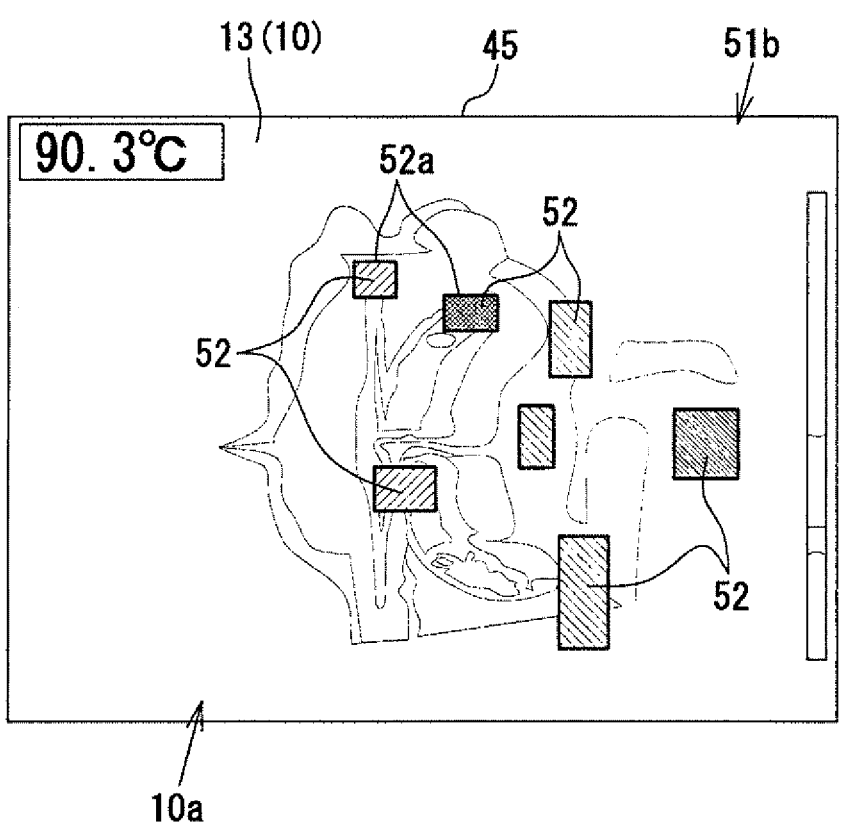
FIG. 12 is the schematic diagram showing the second visible image in which a color image is displayed in the second embodiment.
FIG. 13 is the table showing the correspondence between temperature changes and displays in the second embodiment.

Then, in the temperature-difference-information obtaining step, the CPU 41 compares the corrected thermal images 51*a* and 51*b* to obtain a color image 52 (see FIG. 12), which is the temperature-difference information. The color image 52 of this embodiment is formed by filling the inside of a rectangular white frame 52*a* with other different colors depending on the level (magnitude) of the temperature difference. As shown in FIG. 13, when the temperature drops by 10° C. or more, the inside of the frame 52*a* becomes a color image 52 filled with blue. On the other hand, when the temperature rises less than 10° C., the inside of the frame 52*a* becomes a color image 52 filled with yellow. When the temperature rises 10° C. or more and less than 50° C., the inside of the frame 52*a* becomes a color image 52 filled with red. When the temperature rise is 50° C. or more, the inside of the frame 52*a* becomes a color image 52 filled with pink.

Furthermore, in the temperature difference information display step, the CPU 41 displays the color image 52 on the display device 45 while being superimposed on the corresponding portion of the corrected second thermal image 51*b* (See FIG. 12). As a result, portions of the surface 10*a* of the drying furnace 10 judged to have a significant temperature rise or temperature drop are displayed in different colors.

Therefore, according to this embodiment, the color image 52, indicating the magnitude of the temperature change, is displayed while being superimposed on the second thermal image 51*b*, indicating the current (today's) surface temperature of the drying furnace 10. Thereby, the operator can learn not only the temperature change but also the current temperature of the surface 10*a* of the drying furnace 10. Further, the color image 52 of the present embodiment is formed by filling the inside of the white frame 52*a* with a color different from the color of the second thermal image 51*b*, thus making it easy to distinguish the color of the second thermal image 51*b* from the color within the frame 52*a* of the color image 52.

Also, each of the above embodiments may be modified as follows.

According to the first embodiment above, the CPU 41 performs control to correct the deviation of the field angle of only the second visible image 31*b* of the first visible image 31*a* and the second visible image 32*b*, then displays the color image 35 while being superimposed on the corrected second visible image 31*b*. However, the CPU 41 may perform control to correct the deviation of the field angle of only the first visible image 31*a*, not of the second visible image 32*b*, then to display the color image 35 while being superimposed on the corrected first visible image 31*a*. Further, the CPU 41 may perform control to correct the deviation of the field angle of both the visible images 31*a* and 31*b*, then display the color image 35 while being superimposed on the corrected first visible image 31*a* or on the corrected second visible image 31*b*. Furthermore, the CPU 41 performs control to display the color image 35 while being superimposed on the first visible image 31*a* or on the second visible image 31*b* without correcting the deviation of the field angle of the visible images 31*a* and 31*b*.

Figures 5A, 5B:
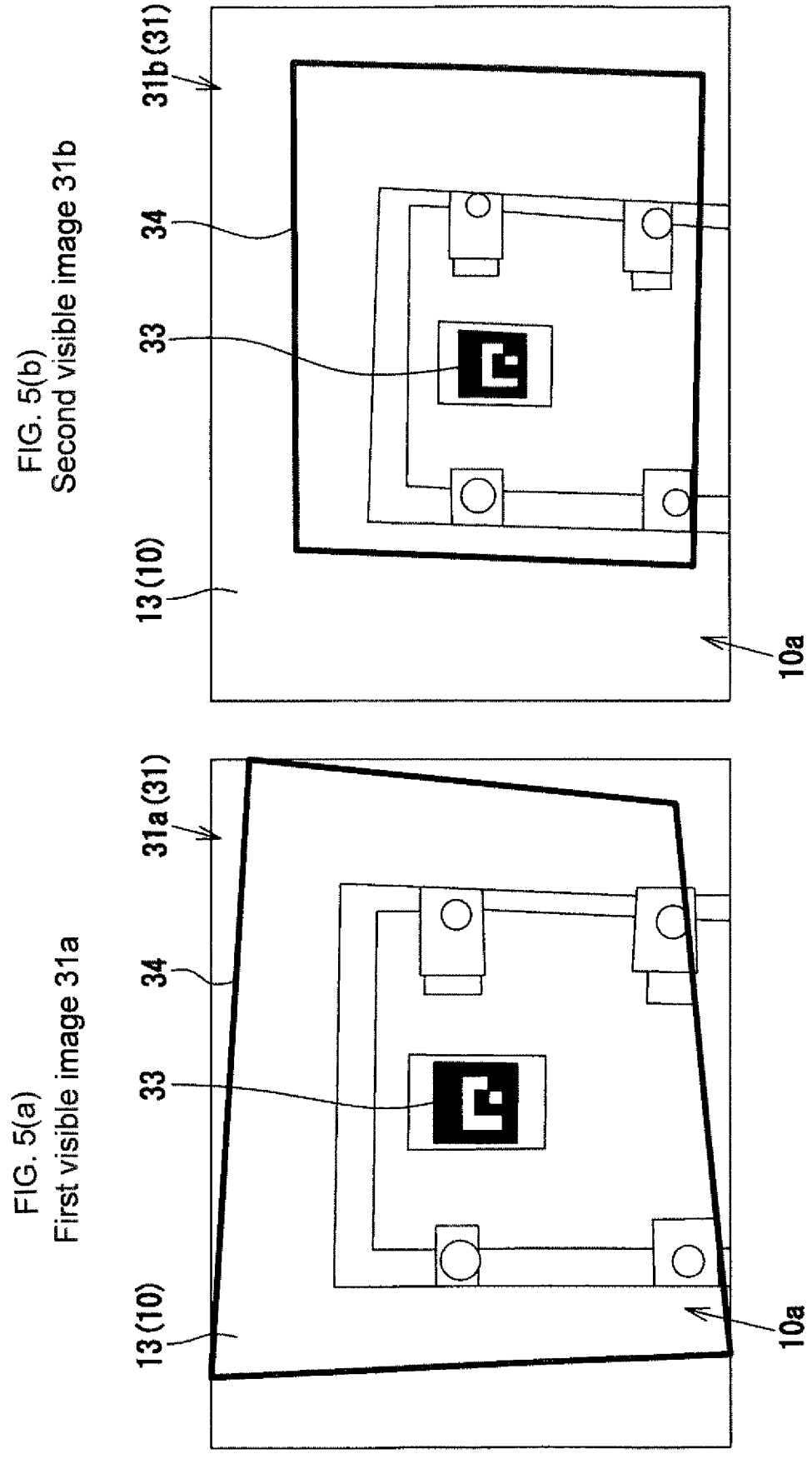
FIG. 5(a) is the schematic diagram showing the first visible image in which a frame is set.
FIG. 5(b) is the schematic diagram showing the second visible image in which a frame is set.

According to the first embodiment above, since the imaging range of the second visible image 31*b* is larger than the imaging range of the first visible image 31*a*, when the frame 34 set on the first visible image 31*a* is reflected in the visible image 31*b*, the entire frame 34 is displayed so as to fit within the second visible image 31*b* (See FIGS. 5(*b*) and 6(*b*)). However, the imaging range of the second visible image 31*b* may be the same size as the imaging range of the first visible image 31*a* or smaller than the imaging range of the first visible image 31*a*.

According to the second embodiment above, the CPU 41 performs control to display the color image 52 on the display device 45 while being superimposed on the corresponding position on the corrected second thermal image 51*b*. However, the CPU 41 may perform control to display the color image 52 while being superimposed on the corresponding position on the corrected first thermal image 51a.

According to each embodiment above, the first visible image 31a is an image obtained one month ago by capturing the image of the measurement points A0 to A13. The second visible image 31b is an image obtained newly today by capturing the image of the same measurement points A0 to Al3 so that the image 31a and 31b are compared with each other. However, the combination of periods for comparing the visible images 31a and 31b can be changed accordingly. Specifically, the first visible image 31a may be an image obtained, e.g., one year ago by capturing the image of the measurement points A0 to A13, and the second visible image 31b may be an image, e.g., six months ago by capturing the image of the measurement points A0 to A13.

According to each embodiment above, the visible image 31 and the thermal image 32 obtained by capturing with the thermo-camera 30 are stored in the RAM 43. Then, the subsequent correction step (step S9) corrects the deviation of the field angle of the thermal image 32 and of the visible image 31 read out from the RAM 43. However, the visible image 31 and the thermal image 32 captured by the thermo-camera 30 may be stored in the RAM 43 in a state where the deviation of the field angle is corrected in advance.

According to each embodiment above, the square-shaped marker 33 is used as a common reference part existing in the first visible image 31a and the second visible image 31b. However, a marker in the shape of a rectangle, a parallelo-gram, a rhombus or the like may be used as a common reference part. Also, when using a different algorithm from ARToolkit, which requires a marker with two parallel sides facing each other, to calculate the posture and position of the marker (see step S3 in FIG. 3), a marker in the shape of a trapezoid, a circle, an ellipsoid or the like can be used as a common reference part. Also, instead of the marker 33, other two-dimensional objects, such as pictures, letters, symbols, etc., may be used as a common reference part. Furthermore, a three-dimensional object, such as parts existing on the surface of the facility equipment, may be used as a common reference part.

According to each embodiment above, when the tempera-ture difference obtained by comparing the thermal images 32a and 32b (or the thermal images 51a and 51b) signifi-cantly exceeds a predetermined threshold value (here, 50° C.), the alarm 46 is activated to warn the operator. However, when the temperature difference falls below a threshold value (e.g., −10° C.), the alarm 46 may be activated to warn the operator, thus making it possible to detect refrigerant leakage in facility equipment of a chemical plant or the like.

According to each embodiment above, the thermo-camera 30 is used as the image-capturing device to capture the image of the surface 10a of the drying furnace 10 and to acquire the visible image 31 and the thermal image 32 simultaneously. However, the image-capturing device may be configurated; by a visible image capturing camera (vis-ible image capturing device) to capture the image of the surface 10a of the facility equipment 10, thus obtaining the visible image 31 and; by a thermal image capturing camera (thermal image capturing device) provided separately from the visible image capturing camera to obtain the thermal image 32, thus capturing the image of the surface 10a of the facility equipment 10. In addition, the visible image captur-ing camera and the thermal image capturing camera should preferably be arranged as close to each other as possible.

According to each embodiment above, all the images of the measurement points A0 to A13 are captured by the non-fixed thermo-camera 30, but some of the measurement points A0 to A13 may be captured by the fixed-type thermo-camera.

According to each embodiment above, the thermo-camera 30 transmits image data to the control device 40 via a USB cable. However, image data may be transmitted to the control device 40 using other devices, e.g., a communication device such as Bluetooth® (registered trademark of Blu-etooth SIG, Inc.), infrared communication, Internet line, (telephone line, or the like).

According to each embodiment above, the facility-equip-ment temperature control system 1 includes the thermo-camera 30 and a computer having a display device (display 45) and an image processing device (CPU 41). However, the thermo-camera may include an internal image processing device to display a color image on the display of the thermos-camera while being superimposed on the corre-sponding portion of the visible image or of the thermal image.

According to each embodiment above, the facility-equip-ment temperature control system 1 is a system for control-ling the surface temperature of the drying furnace 10. However, it may also be a system to control the surface temperature of a coating booth for coating the work W1 or other facility equipment such as a chemical plant or the like.

Besides the technical ideas of the present invention, as described above, other technical ideas to be understood are described hereinafter.

(1) A facility-equipment temperature control system according to any one of the first to seventh aspects of the present invention, characterized in that the image-capturing device may be configurated; by a visible image capturing camera (visible image capturing device) to capture the image of the surface of the facility equipment, thus obtaining the visible image and; by a thermal image capturing camera (thermal image capturing device) provided separately from the visible image capturing camera to obtain the thermal image, thus obtaining the image of the surface 10a of the facility equipment 10.

(2) A facility-equipment temperature control system according to any one of the first to seventh aspects of the present invention, characterized in that the temperature difference obtained by comparing the corrected thermal images is the temperature difference to be calculated in the case where the temperature indicated by the second thermal image is higher than the temperature indicated by the first thermal image.

(3) A facility-equipment temperature control system according to any one of the first to seventh aspects of the present invention, characterized in that the temperature difference obtained by comparing the corrected thermal images is the temperature difference to be calculated in the case where the temperature indicated by the second thermal image is lower than the temperature indicated by the first thermal image.

DESCRIPTION OF THE REFERENCE
NUMERALS

1: Facility-equipment temperature control system
10: Drying furnace as the facility equipment
10a: Surface of the facility equipment
30: Thermo-camera as the image-capturing device
31: Visible image
31a: First visible image
31b: Second visible image
32: Thermal image 32*a*, 51*a*: First thermal image
32*b*, 51*b*: Second thermal image
33: Marker as the common reference part
34: Frame as the comparison area
35, 52: Color image as the temperature difference information
40: Control device as the processor
41: CPU as the image processing device and the past-
image selecting unit
43: RAM as the storage part
45: Display as the display device
46: Alarm as the warning device
A0 to A13: Measurement point

The invention claimed is:
1. A system for controlling the surface temperature of
facility equipment, characterized by including:
  a non-fixed type image capturing means that captures, at
    a specific measurement point in the facility where a
    marker is present, a first visible image and a first
thermal image corresponding to the first visible image,
    and captures, at a different time, the same measurement
    point in the facility to obtain a second visible image and
    a second thermal image corresponding to the second
    visible image;
a display device for displaying the visible and thermal
    images; and
  an image processing device:
    that sets a comparison area, the comparison area at the
      same position and in the same range of the first
visible image and the first thermal image and the
      second visible image and a second thermal image,
      based on shape information of the marker as a
      common reference part present, the comparison area
      between the first visible and thermal images obtained
by the capturing of the image of the specific mea-
      surement point in the facility equipment and the
      second visible and thermal images obtained by the
      capturing of the image of the same measurement
      point in the facility equipment at the different time;
then corrects a deviation of a field angle for the
      comparison area of the first and second thermal
      images so that the first thermal image corresponding
      to the first visible image and the second thermal
      image corresponding to the second visible image can
be superimposed, thus displaying a temperature dif-
      ference information obtained by comparing the cor-
      rected thermal images on the display device,
    wherein the image processing device superimposes and
      reflects a first frame defining an outline of the
comparison area set in the first visible image onto the
      first thermal image corresponding to the first visible
      image and superimposes and reflects a second frame
      defining an outline of the comparison area set in the
      second visible image onto the second thermal image
corresponding to the second visible image, and then
      corrects at least one of the images within the com-
      parison area defined by the first frame and the
      comparison area defined by the second frame so that
      images with these comparison areas have the same
area and the same shape, thereby correcting the
      deviation of the field angle concerning the compari-
      son area of the first thermal image corresponding to
      the first visible image and the second thermal image
      corresponding to the second visible image enabling
superimposition of the first thermal image and the
      second thermal image.

2. A system for controlling the surface temperature of
facility equipment according to claim 1, wherein the image
processing device corrects a deviation of a field angle of at
least one of the first visible image and the second visible
image based on the comparison area, and displays the
temperature difference information on the display device
while being superimposed on a corresponding portion of the
corrected first visible image or of the corrected second
visible image.
3. A system for controlling the surface temperature of
facility equipment according to claim 1, wherein the image
processing device displays the temperature difference infor-
mation on the display device while being superimposed on
the corresponding portion of the corrected first visible image
or of the corrected second visible image.
4. A system for controlling the surface temperature of the
facility equipment according to claim 1, wherein the marker
is a two-dimensional marker attached to the surface of the
facility equipment.
5. A system for controlling the surface temperature of
facility equipment according to claim 4, characterized by
comprising;
  a storage part to store the visible image and the corre-
    sponding thermal image; and
  a past-image selection unit that refers to the marker when
    the second visible image is newly captured at the
    specific measurement point with the image-capturing
    device, selects the first visible image captured at the
    same measurement point in the past and the corre-
    sponding first thermal image, and reads them from the
    storage part.
6. A system for controlling the surface temperature of
facility equipment according to claim 1, wherein the tem-
perature difference information is a color image of which
different colors are set according to the level of the tem-
perature difference.
7. A system for controlling the surface temperature of
facility equipment according to claim 1, characterized by
further having a warning device that issues a warning when
a temperature difference provided by comparing the thermal
images exceeds a predetermined threshold.
8. A method for controlling the surface temperature of
facility equipment using a non-fixed image-capturing device
for capturing a visible image and a thermal image by
capturing the image of the surface of the facility equipment
and a display device for displaying the visible image and the
thermal image the method comprising:
  an imaging step of capturing, by the non-fixed image
    capturing device, at a specific measurement point in the
    facility where a marker is present, a first visible image
    and a first thermal image corresponding to the first
    visible image, and capturing, at a different time, the
    same measurement point in the facility by the non-fixed
    image capturing device to obtain a second visible
    image and a second thermal image corresponding to the
    second visible image;
  a comparison-area setting step for setting a comparison
    area, the comparison area at the same position and in
    the same range of the first visible image and the first
    thermal image and the second visible image and a
    second thermal image based on the shape information
    of the marker as a common reference part present, the
    comparison area between the first visible and thermal
    images obtained by the capturing of the image of the
    specific measurement point of the facility equipment
    and the second visible and thermal images obtained by the capturing of the image of the same measurement point of the facility equipment at the different time;

a correction step for correcting a deviation of a field angle in the comparison area of the first and second thermal images so that a first thermal image corresponding to the first visible image and a second thermal image corresponding to the second visible image are super-imposed;

a temperature-difference information obtaining step for obtaining temperature difference information by comparing the corrected thermal images; and a temperature difference information display step for displaying the temperature difference information on the display device, and a frame reflecting step for superimposing and reflecting a first frame defining an outline of the comparison area set in the first visible image onto the first thermal image corresponding to the first visible image and superimposing and reflecting a second frame defining an outline of the comparison area set in the second visible image onto the second thermal image corresponding to the second visible image, and wherein the correction step corrects the deviation of the field angle concerning the comparison area of the first thermal image corresponding to the first visible image and the second thermal image corresponding to the second visible image enabling superimposition of the first thermal image and the second thermal image.

9. A non-transitory computer readable storage medium to run a processor that controls a facility-equipment temperature control system, including an image-capturing device that captures a visible image and a thermal image of the surface of the facility equipment and a display device that displays the visible image and the thermal image to execute;

an imaging step of capturing, by the image capturing means, at a specific measurement point in the facility where a marker is present, a first visible image and a first thermal image corresponding to the first visible image, and capturing, at a different time, the same measurement point in the facility by the image capturing means to obtain a second visible image and a second thermal image corresponding to the second visible image;

a comparison area setting step for setting a comparison area, the comparison area at the same position and in the same range of the first visible image and the first thermal image and the second visible image and the second thermal image based on the shape information of the marker as a common reference part present, the comparison area between the first visible and thermal images obtained by the capturing of the image of the specific measurement point in the facility equipment and the second visible and thermal images obtained by capturing of the image of the same measurement point of the facility equipment at the different time;

a correction step for correcting a deviation of a field angle in the comparison area of the first and second thermal images so that the first thermal image corresponding to the first visible image and the second thermal image corresponding to the second visible image are super-imposed;

a temperature-difference-information obtaining step for obtaining the temperature difference information by comparing the corrected thermal images; and a temperature-difference-information display step for displaying the temperature difference information on the display device, and a frame reflecting step for superimposing and reflecting a first frame defining an outline of the comparison area set in the first visible image onto the first thermal image corresponding to the first visible image and superimposing and reflecting a second frame defining an outline of the comparison area set in the second visible image onto the second thermal image corresponding to the second visible image, and wherein the correction step corrects the deviation of the field angle concerning the comparison area of the first thermal image corresponding to the first visible image and the second thermal image corresponding to the second visible image enabling superimposition of the first thermal image and the second thermal image.

10. The method of claim 8, wherein the marker is a two dimensional marker affixed to the surface of the facility equipment.

11. The non-transitory computer readable storage medium of claim 9, wherein the marker is a two dimensional marker affixed to the surface of the facility equipment.

* * * * *